United States Patent [19]

Fitzgibbons

[11] 4,188,292

[45] Feb. 12, 1980

[54] INEXPENSIVE PURIFICATION OF UREA WASTE STREAMS

[75] Inventor: William O. Fitzgibbons, Hudson, Ohio

[73] Assignee: Standard Oil Company, Cleveland, Ohio

[21] Appl. No.: 847,201

[22] Filed: Oct. 31, 1977

Related U.S. Application Data

[63] Continuation-in-part of Ser. No. 463,476, Apr. 24, 1974, abandoned.

[51] Int. Cl.$^2$ ............................ C02B 1/16; C02B 1/44
[52] U.S. Cl. .................... 210/29; 210/38 A; 210/38 B; 210/63 R
[58] Field of Search ...................... 210/24, 33, 26, 28, 210/29, 38, 50, 59, 63 R, 60

[56] References Cited

U.S. PATENT DOCUMENTS

| | | | |
|---|---|---|---|
| 2,744,840 | 5/1956 | Daniels | 210/33 |
| 3,313,726 | 4/1967 | Campbell | 210/33 |
| 3,316,171 | 4/1967 | Mastrorilli | 210/38 |
| 3,655,395 | 4/1972 | Karnemat | 210/59 |
| 3,755,088 | 11/1973 | Higgins | 210/33 |

OTHER PUBLICATIONS

Hackh's Chemical Dictionary, McGraw-Hill Book Co., New York, Fourth Edition, 1972, pp. 461–462, 457 and 459.

Organic Chemistry, Astle and Shelton, 2nd Edition, New York, 1959, p. 208.

Amber-Hi-Lites, Rohm and Haas, Oct. 1971.

*Primary Examiner*—Robert H. Spitzer
*Assistant Examiner*—Ernest G. Therkorn
*Attorney, Agent, or Firm*—John E. Miller, Jr.; Herbert D. Knudsen; Larry W. Evans

[57] ABSTRACT

Urea is destroyed in aqueous waste streams containing various anions and cations plus urea by contacting the stream with a cation exchange resin, then reacting the resulting stream with nitric oxide, nitrous acid or a nitrite salt to convert the urea to nitrogen, carbon dioxide and water and treating the resulting stream with an anion exchange resin. A pure aqueous stream is obtained which does not adversely affect the environment and which may be recycled to a plant as fresh water resulting in large monetary savings in fresh water cost.

16 Claims, No Drawings

INEXPENSIVE PURIFICATION OF UREA WASTE STREAMS

REFERENCE TO RELATED APPLICATIONS

This is a continuation-in-part of my earlier application Ser. No. 463,476 filed Nov. 24, 1974 now abandoned.

BACKGROUND OF THE INVENTION

Urea is found in the aqueous effluents of a number of commercial plants. These streams have been traditionally discharged to the environment because commercial removal technology has not been available for treatment of these streams.

The only method of treating urea-containing aqueous streams has been steam treatment wherein the urea is hydrolyzed at high temperatures under high pressure. This treatment, as can be imagined, would be very expensive when applied to large-volume, low-concentration streams.

U.S. Pat. No. 2,744,840 to Daniels, et al. discloses a method of sugar purification ion exchange by removing $Na^+$, $K^+$, $Ca^{++}$, $Mg^{++}$ and the like with a hydrogen cation exchange bed in series with an anion exchange bed.

U.S. Pat. No. 3,655,395 discloses a process for treating odiferous industrial and municipal waste materials by adding formaldehyde, nitric acid and urea to the waste materials in sequence. The urea reacts with the residual formaldehyde in the mixture, in the presence of the nitric acid as a catalyst, in order to form a urea-formaldehyde condensation product.

U.S. Pat. No. 3,313,726 to Campbell discloses a process for regenerating strongly acidic cation exchange resins and strongly basic anion exchange resins to substantially their original ion-exchange capacity when the regeneration is preceded by a defouling step.

Rohm and Haas, "Amber-Hi-Lites," (October 1971) contains a chart of the chemical and physical properties and a summary of applications of the Amberlite and Amberlyst ion exchange resins.

U.S. Pat. No. 3,316,717 to Mastrorillo discloses a process of regenerating cation exchange resins and, particularly, a process for regenerating, in a hydrogen cycle, cation resins used in water treatment plants. An at least partially spent cationic exchange resin containing cations removed from water is treated with a solution containing a monobasic acid selected from the group consisting of hydrochloric acid, hydrobromic acid, nitric acid, nitrous acid, acetic acid and propionic acid so as to form a solution containing the salt of a monobasic acid and the cations.

U.S. Pat. No. 3,775,088 to Higgins discloses a process for treating fertilizer plant waste streams containing ammonium, hardness metal and nitrate values to recover an ammonium nitrate fertilizer and a demineralized and substantially nitrate-free aqueous stream. This process includes initially removing the ammonium ion and hardness metal ion values from the fertilizer plant waste stream with a cation exchange resin bed and then contacting the essentially ammonium and hardness ion-free aqueous stream with an anion exchange resin bed to recover a second ammonium nitrate fertilizer stream and a demineralized and nitrate-free aqueous stream.

This patent states at Column 7, lines 35-40 that "prior to introducing the fertilizer plant waste aqueous stream into the cation exchange column loop 10, preferably this stream is passed through one or more filters to remove particulate matter and urea." The fertilizer plant waste aqueous stream which is passed through one or more filters to remove particulate matter and urea is a non-acid environment. The nitrous acid of the present invention may not be substituted for the filtration step in Higgins because nitrous acid will not remove urea in said non-acid, mineral ion containing solution, i.e. nitrous acid will not react with urea in a non-acid environment. Moreover, the nitrous acid of the present invention and the nitric acid employed as a regenerating agent in Higgins may not be successfully interchanged because nitrous acid is not as strong as nitric acid and is considered an unstable compound and therefore, nitrous acid would not be suitable as a regenerating agent.

*Astle and Shelton,* Organic Chemistry, 2nd Edition (New York, 1959), p. 208, shows the laboratory reaction of urea with nitrous acid. The reaction or urea and nitrous acid in Astle is a quantitative analysis laboratory experiment. This reaction does not go to the "heart" of the present invention, which is the immediate destruction of urea in conjunction with ion exchange removal of pollutants from waste water. The Astle publication does not fairly suggest the use of nitrous acid in the destruction of urea in commercial waste streams which contain other pollutants.

U.S. Pat. No. 3,113,837 to Scanley discloses a process for obtaining a stabilized nitrous acid. Particularly, this patent relates to a process for preparing a stabilized, concentrated solution of nitrous acid free from contaminants. Scanley states at Column 1, lines 23 to 31 as follows:

" . . . , it is also known that nitrous acid is a useful reactant in many varied organic reactions. Since such reactions are often conducted in a minimal aqueous environment, the preparation of a dilute aqueous solution of nitrous acid contaminated with mineral acids and salts cannot be readily utilized as an article of commerce."

SUMMARY OF THE INVENTION

The present invention is a process for purifying an aqueous stream containing cations, anions and urea comprising the steps of (a) contacting the aqueous stream with a hydrogen form cation exchange resin in such a manner that at least some of the cations in the aqueous stream are exchanged with the cations of the resin, and (b) contacting the resulting stream from step (a) with nitric oxide, nitrous acid or a nitrite salt so that the urea is at least partially reacted to give as primary products nitrogen, carbon dioxide and water. The process of the invention produces a very pure aqueous stream that is most conveniently recycled to plant operations saving fresh water cost. Alternatively, the stream can be discharged safely into the environment. Above all, use of the present invention avoids the discharge of unacceptable urea waste streams into the environment.

By the preferred procedure, the present invention is a process for destroying urea in an aqueous stream containing anions, cations and urea comprising the steps of:

(a) contacting the aqueous stream with a hydrogen form exchange resin in such a manner that at least some of the cations in the aqueous stream are exchanged with the cations of the resin, and (b) contacting the resulting stream from step (a) with nitric oxide, nitrous acid or a nitrate salt thereby rendering said aqueous stream substantially free of urea. It is to be understood that by the term "substantially" is meant at least 75% of the stoichiometric amount of urea is eliminated from the effluent of step (b). Most preferred is the complete elimination of urea from the effluent in step (b).

The central aspect of the present invention is the ability to economically treat waste streams containing urea. No suitable commercial technology has been available for this treatment.

The first step in the process of the invention is the treatment of the aqueous waste stream with a hydrogen form cation exchange resin. Cation exchange resins that are suitable for this operation are well known and readily available commercially. These resins are strong acid and weak acid cation exchange resins that have the capacity to exchange one or more protons for the cation found in the aqueous stream. Particular cations found in the aqueous stream that are of special interest in the present invention are $Na^+$, $K^+$, $NH_4^+$, $Ca^{++}$, $Mg^{++}$, $Fe^{++}$, $Fe^{+3}$ or mixtures thereof. Preferred in the present invention is the treatment of the aqueous waste stream with a strong acid cation exchange resin to remove substantially all the cations described above.

The cation exchange resin removes the cations other than hydrogen from the aqueous waste stream, but it has substantially no effect on the urea or the anions contined in the waste stream. Thus, the effluent from the cation exchange resin contains urea and various anions.

In a second step, the effluent from the cation exchange resin is then treated in step (b) of the process of the invention. In step (b), the liquid stream from step (a) is contacted with nitric oxide, nitrous acid or a nitrite salt to convert the urea to nitrogen, carbon dioxide and water.

Nitric oxide is conveniently generated by the oxidation of ammonia at elevated temperatures. Nitrous acid or nitrite salts are also readily available. When nitrite salts are used, sodium or potassium nitrite are preferably employed.

When the aqueous stream treated is to be recycled to a plant for uses such as boiler feed, the introduction of extraneous cations is desirably avoided. The use of nitric oxide or nitrous acid avoids the introduction of these cations. Alternatively, sodium or potassium nitrite can be added before the cation exchange resin treatment, however the urea will not react with the nitrous acid until after cation exchange resin treatment. This approach eliminates the addition of extraneous cations from the effluent.

The molar amount of nitric oxide, nitrous acid or nitrite salt introduced in step (b) of the process may vary depending upon the amount of urea that is to be destroyed. Since it is usually desirable to destroy all of the urea, at least a stoichiometric amount is added according to the following equation:

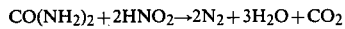

$$CO(NH_2)_2 + 2HNO_2 \rightarrow 2N_2 + 3H_2O + CO_2$$

a large excess of the NO, $HNO_2$ or nitrite, however, is preferably avoided because ammonia is generated at higher stoichiometric concentrations.

The pH of the stream treated in step (b) appears to affect the desirability of the reaction. The treatment with the cation exchange resin produces a stream having a pH in the desirable range. The most desirable pH range for conducting the reaction is between about 1.0 and about 3. At a pH of less than 1.5 there is some tendency to form ammonia; at higher pH values than 3, the rate of reaction appears to be significantly decreased. Especially preferred is conducting the reaction within a pH range of 1.5 to a value less than 3.

The reaction of step (b) can be conducted under a wide variety of process conditions. One important factor is that the reaction rapidly goes to completion in a wide range of temperatures. The reaction is a liquid phase reaction preferably conducted in the temperature range of about 10° to 150° F. Even at room temperature a very desirable complete reaction converting all of the urea to harmless products is obtained.

The pressure of the reaction is not critical. With the nitrous acid and nitrite salts the pressure has substantially no effect except that attributable to the generation of gases in the reaction. For the use of gaseous nitric oxide, it is desirable to use super-atmospheric pressure, preferably about 10–30 p.s.i.g., to increase the contact of the nitric oxide gas with the urea.

As noted above, the reaction appears to go to completion almost instantaneously under the preferred conditions noted above. In experiments, there has been no trace of urea in the treated solution within 10–15 seconds after the beginning of the reaction.

As an alternative procedure, the nitric oxide, nitrous acid or nitrite salt may be added to the aqueous waste stream prior to contact with the cation exchange resin. However, it is to be understood that in accordance with the invention, urea will not be destroyed until after contact with the cation exchange resin.

Using either embodiment of the invention, the effluent containing anions in the preferred practice of the present invention is treated with an anion exchange resin to remove the anions other than $OH^-$ that are present. Suitable anion exchange resins are known and readily available. These anion exchange resins are capable of exchanging one or more hydroxide ions for an anion such as $F^-$, $Cl^-$, $NO_3^-$, $SO_3^-$, $CO_3^=$, $HCO_3^-$, $PO_4^=$ or mixtures thereof. Suitably a strong base anion exchange resin is employed in this step of the process.

Through the three steps of the present invention waste water containing urea is purified to such a degree that it can be recycled to the plant and used as boiler feed. Thus rather than discharging hundreds of millions of gallons of polluted waste water per year, plants using this invention will be able to recycle the waste water for many uses. This will result in fresh water cost savings of several hundred dollars per day for a medium size urea plant. This tremendous savings in water cost combined with the elimination of urea-containing waste streams, make the present invention both economically and environmentally important.

SPECIFIC EMBODIMENTS

Comparative Examples A and B and Examples 1 and 2

Effect of cation exchange resin—Various aqueous solutions of urea were prepared by adding urea to tap water for the example of the invention and adding urea to deionized water for the comparative example. Second, a solution of sodium nitrite containing 10,000 mg./l. of nitrite nitrogen was prepared having a pH of about 5.

For the examples of the invention, the urea solution was passed over a strong acid cation exchange resin at room temperature. The nitrite ion was added and the mixture was allowed to stand at room temperature. The urea concentration as a function of time was measured. The results of these measurements are shown in Table I.

For the comparative experiments using deionized water, the nitrite was added to the urea solution and allowed to stand. These results are also shown in Table I.

TABLE I

Importance of Treatment With Cation Exchange Resin

| Example | Mls. NaNO2 Added | pH | Mg./l. Urea-nitrogen Initial | Time 2 | After 5 | Addition 15 | Min.* 60 |
|---|---|---|---|---|---|---|---|
| 1 | 0.92 | 1.9 | 91.8 | <5 | <5 | n.d. | n.d. |
| 2 | 1.6 | 2.2 | 163 | <5 | <5 | n.d. | n.d. |
| Comp. A | 1.0 | 6.4 | 107 | 91 | 97 | 89 | 94 |
| Comp. B | 1.6 | 7.1 | 157 | 161 | 154 | 149 | 151 |

*n.d. is no data

The data presented above shows that in accordance with the invention urea is immediately destroyed essentially completely.

It was determined that the products consisted essentially of nitrogen, carbon dioxide and water.

EXAMPLES 3-6

Effect of pH

In the same manner as shown above, a stoichiometric amount of sodium nitrite was added to a urea solution having been treated with a strong acid cation exchange resin. The pH of these urea solutions was adjusted from the value of pH 2 after treatment with the strong acid cation exchange resin by the addition of 1 N sulfuric acid or 1 N sodium hydroxide. The results of these experiments are shown in Table II.

TABLE II

Effect of pH on the Urea Destruction

| Example | pH | Urea-Nitrogen, Mg./l. Initial | 5 min. | 10 min. |
|---|---|---|---|---|
| 3 | 1 | 116 | <5 | <5 |
| 4 | 2 | 116 | <5 | <5 |
| 5 | 3 | 116 | 87 | 84 |
| 6 | 4 | 116 | 111 | 106 |

TABLE III

Effect of Various Stoichiometric Amounts of Nitrite Ion

| Example | NaNO2 Stoichiometric Amt. Based on Urea | Ammonia-Nitrogen, Mg./l. Initial | Final | Urea-Nitrogen, Mg./l Initial | 5 min. | 10 min. |
|---|---|---|---|---|---|---|
| 7 | 0.5 | 19 | 19 | 116 | 75 | 51 |
| 8 | 1 | 19 | 19 | 116 | <5 | <5 |
| 9 | 2 | 19 | 21 | 116 | <5 | <5 |
| 10 | 5 | 19 | 27 | 116 | <5 | <5 |
| 11 | 10 | 19 | 76 | 116 | <5 | <5 |

EXAMPLES 7-11

Effect of Different Stoichiometric Amounts

In the same manner as described above, the urea solution was contacted with a strong acid cation exchange resin using different stoichiometric amounts of sodium nitrite. These data are shown in Table III.

EXAMPLES 12-19

Use of NO Gas

A 250 cc Parr bomb equipped with a pressure gauge was filled with 100 ml. of decationized water containing 100 mg. of urea nitrogen/liter. NO gas was placed in another bomb and the two bombs were connected in such a manner that NO was added to the solution containing urea. The results of these experiments are shown in Table IV.

TABLE IV

Use of NO Gas to Destroy Urea

| Example | Mg. NO Added | pH | NH3-Nitrogen, mg/l. Initial | Final | Urea-Nitrogen, mg/l. Initial | 5 min. | 10 min. |
|---|---|---|---|---|---|---|---|
| 12 | 35 | 2.2 | 24 | 23 | 160 | <5 | <5 |
| 13 | 70 | 2.2 | 24 | 27 | 160 | <5 | <5 |
| 14 | 140 | 2.2 | 24 | 82 | 160 | <5 | <5 |
| 15 | 35 | 1.0 | 24 | 41* | 160 | <5 | <5 |
| 16 | 35 | 1.5 | 24 | 25 | 160 | <5 | <5 |
| 17 | 35 | 2.5 | 24 | 23 | 160 | <5 | <5 |
| 18 | 35 | 3.0 | 24 | 24 | 160 | 95 | 95 |
| 19 | 35 | 3.5 | 24 | 22 | 160 | 158 | 152 |

*an increase in ammonia was also noted with nitrite ion in Example 3.

In the same manner as shown above, nitrous acid could be employed to destroy urea according to the invention. Also, in addition to the treatment of the cation exchange resin and the nitrite ion above, the aqueous stream could be

Comparative Example C and Example 20

Effect of Treating Waste Stream with Nitric Acid Compared with Treating Stream with Nitrous Acid These experiments were accomplished by placing activated strong acid cation exchange resin in a tube and regenerating this resin with nitric acid; subsequent to this regeneration a urea solution obtained from a fertilizer plant effluent was passed over the regenerated resin. Analysis of the urea content of the solution was made before and after passing the urea solution over the cation exchange resin using an analysis technique that is accurate to ±10 mg./l of urea nitrogen. For the experiment of the invention exactly the same procedure was employed except that nitrous acid was used. The results of these tests are shown in the following Table where the urea analysis before and after treatment with the cation exchange resin are given.

TABLE V

Comparison of Nitric Acid with Nitrous Acid in the Destruction of Urea

| Example | Acid Employed | Urea Concentration mg./l of Urea Nitrogen Initial | Final |
|---|---|---|---|
| Comp. C. | nitric acid HNO3 | 90 | 96 |
| 20 | nitrous acid HNO2 | 87 | 0 |

The data in the Table above give the results obtained immediately after the cation exchange resin treatment. More than 40 hours after the cation exchange resin treatment the product of the Higgins procedure was still analyzed to contain about 90 mg./l of urea nitrogen.

Based on the above data, nitric acid has little or no effect on the urea concentration, but the nitrous acid of the invention immediately destroys the urea completely.

I claim:

1. A process for destroying urea dissolved in an aqueous stream further containing anions and cations comprising:
   (a) contacting the aqueous stream with a hydrogen form cation exchange resin in such a manner that at least some of the cations in the aqueous stream are exchanged with the cations of the resin, and
   (b) contacting the resulting stream from step (a) with nitric oxide, nitrous acid or a nitrite salt, thereby substantially reducing the urea content of said aqueous stream, said resulting stream having a pH of 1–3 when contacted with said nitric oxide, nitrous acid or a nitrate salt.

2. The process of claim 1 wherein the cations in the aqueous stream are $Na^+$, $K^+$, $NH_4^+$, $Ca^{++}$, $Mg^{++}$, $Fe^{++}$, $Fe^{+3}$ or mixtures thereof.

3. The process of claim 1 wherein the cation exchange resin is a strong acid cation exchange resin.

4. The process of claim 1 wherein the stream treated in step (b) has a pH from 1.0 to 3.0.

5. The process of claim 1 wherein the stream treated in step (b) has a pH of from 1.5 to a value less than 3.

6. The process of claim 1 wherein the stream treated in step (b) has a temperature of about 10° to about 150° F.

7. The process of claim 1 wherein the stream in step (b) is treated with nitric oxide or nitrous acid.

8. The process of claim 1 wherein at least 75% of the urea is eliminated from the effluent of step (b).

9. The process of claim 1 wherein urea is completely eliminated from the effluent of step (b).

10. The process of claim 1 wherein the aqueous effluent from step (b) is treated with an anion exchange resin.

11. The process of claim 1 wherein the anions in the aqueous stream are $F^-$, $Cl^-$, $NO_3^-$, $SO_4^=$, $CO_3^=$, $HCO_3^-$, $PO_4^=$ or mixture thereof.

12. The process of claim 1 wherein the resulting stream from step (a) is contacted with nitric oxide or a nitrite salt.

13. A process for destroying urea dissolved in an aqueous stream further containing anions and cations comprising:
   (a) adding nitric oxide, nitrous acid or a nitrite salt to the aqueous stream and
   (b) contacting the resulting aqueous stream from step (a) with a hydrogen form cation exchange resin in such a manner that at least some of the cations in the aqueous stream are exchanged with the cations of the resin, thereby substantially reducing the urea content of said aqueous stream, the aqueous stream after contact with said cation exchange resin having a pH of 1–3.

14. The process of claim 13 wherein nitric oxide or nitrite salt is added to said aqueous stream.

15. A process for destroying urea dissolved in an aqueous stream further containing anions and cations comprising
   (a) contacting the aqueous stream with a hydrogen form cation exchange resin in such a manner that at least some of the cations in the aqueous stream are exchanged with the cations of the resin, and
   (b) contacting the resulting stream from step (a) with nitric oxide, nitrous acid or a nitrite salt so that the urea is at least partially reacted to give as primary products nitrogen, carbon dioxide and water, said resulting stream having a pH of 1–3 when contacted with said nitric oxide, nitrous acid or a nitrite salt.

16. The process of claim 15 wherein said resulting stream is contacted with nitric oxide or nitrite salt.

* * * * *